United States Patent
Farah et al.

(10) Patent No.: US 12,546,716 B2
(45) Date of Patent: Feb. 10, 2026

(54) DEVICE FOR MEASURING THE HUMIDITY IN THE INTERNAL VOLUME OF A WATCH CASE

(71) Applicant: The Swatch Group Research and Development Ltd, Marin (CH)

(72) Inventors: Hicham Farah, Sonceboz-Sombeval (CH); Pierpasquale Tortora, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 142 days.

(21) Appl. No.: 18/659,070

(22) Filed: May 9, 2024

(65) Prior Publication Data

US 2024/0410828 A1   Dec. 12, 2024

(30) Foreign Application Priority Data

Jun. 9, 2023   (EP) .................................... 23178514

(51) Int. Cl.
  *G01N 21/61*   (2006.01)
  *G01N 21/03*   (2006.01)
  *G04D 7/00*   (2006.01)

(52) U.S. Cl.
  CPC ........... *G01N 21/61* (2013.01); *G01N 21/031* (2013.01); *G04D 7/004* (2013.01)

(58) Field of Classification Search
  CPC .... G01N 21/61; G01N 21/31; G01N 21/3504; G01N 21/354; G01N 21/031;

(Continued)

(56) References Cited

U.S. PATENT DOCUMENTS

| 2021/0088981 A1* | 3/2021 | Liang .................... H04R 1/342 |
| 2022/0120677 A1* | 4/2022 | Dubugnon ......... G01N 21/3554 |
| 2022/0121157 A1 | 4/2022 | Dubugnon et al. |

FOREIGN PATENT DOCUMENTS

| EP | 3 985 455 A1 | 4/2022 |
| JP | 2008-164576 A | 7/2008 |

OTHER PUBLICATIONS

European Search Report issued Nov. 13, 2023 in European Application 23178514.8 filed on Jun. 9, 2023, 3 pages (with English Translation of Categories of Cited Documents).

(Continued)

*Primary Examiner* — Tarifur R Chowdhury
*Assistant Examiner* — Carlos Perez-Guzman
(74) *Attorney, Agent, or Firm* — Oblon, McClelland, Maier & Neustadt, L.L.P.

(57) ABSTRACT

A device for measuring the humidity in the internal volume of a case of a watch, which device includes a watch including a case housing an optical system, the optical system including a transmitter transmitting a light beam, a multi-pass cell through which the light beam is intended to pass, and a receiver intended to receive the light beam once it has passed through the multi-pass cell; a management module external to the case, including a processing unit configured to communicate with the optical system and to process data transmitted thereby in order to determine the humidity present in the internal volume of the case on the basis of the absorption of the light beam by the water vapour that may be present in the internal volume of the case.

5 Claims, 1 Drawing Sheet

(58) Field of Classification Search
CPC ......... G04D 7/004; G04D 7/007; G01J 3/021; G01J 3/0291; G01J 3/42; G01M 3/38; G04B 47/06; G04C 10/00; G04G 19/00; G04G 21/02
See application file for complete search history.

(56) References Cited

OTHER PUBLICATIONS

Kebabian et al., "Water vapour sensing using polarization selection of a Zeeman-split argon discharge lamp emission line", Measurement Science and Technology, vol. 9, 1998, 4 pages.

* cited by examiner

DEVICE FOR MEASURING THE HUMIDITY IN THE INTERNAL VOLUME OF A WATCH CASE

CROSS-REFERENCE TO RELATED APPLICATION

This application claims priority to European Patent Application No. 23178514.8 filed on Jun. 9, 2023, the entire disclosure of which is hereby incorporated herein by reference.

TECHNICAL FIELD OF THE INVENTION

The invention relates to devices for measuring parameters applied to the field of watchmaking and in particular to devices for measuring the humidity in the internal volume of a watch case.

More specifically, the invention relates to a device for measuring the humidity in the internal volume of a watch case.

TECHNOLOGICAL BACKGROUND

Nowadays, all watches are designed to be water-resistant, i.e. to withstand the penetration of water in liquid form within the internal volume of their case. Depending on its watertightness, this means that a watch can be used in damp environments or immersed in water. For example, diving watches are designed to withstand the pressure generated by water on the walls of their case, at least to a depth of 100 m.

To guarantee water-resistance, the watches are fitted with joints positioned in the assembly interfaces of certain case components, such as the crystal, bezel, back of the watch, crown and push-buttons.

However, the mechanical properties of joints change over time and according to the climate conditions of the environment in which the watches are used, which can lead to a deterioration in their water-resistance. Watches can then become permeable to water and condensation can appear in their internal volume, on the surface of their components, which can cause oxidation of the metal components or degradation of the polymer components.

Moreover, the joints and/or certain external parts made of polymer materials can be subject to permeation, i.e. they allow a certain quantity of water vapour present in the environment in which the watch is located to pass through so that there is a balance between the inside and outside of the watch. This balance can be achieved in a few hours or a few weeks, depending on the quality of the construction of the watch and the joints, and on the environment. In this case, the amount of vapour present in the watch can vary depending on the wearer and differences in outside temperature over time.

In order to limit the risks of loss of water-resistance or of too great an increase in the permeation of the polymer materials used, it is recommended to service a watch regularly, during which it must be opened. Opening the watch is relatively costly insofar as it must be carried out by a watchmaker and involves the systematic replacement of all of the joints.

Humidity measurement devices have thus been developed and integrated into watch cases to measure the humidity and detect any anomaly linked to the presence of water or water vapour without having to open the case.

Examples include measuring devices in the form of a small electronic module capable of measuring and recording the values of various environmental parameters, including relative humidity. Such an electronic module is able to measure, via a dedicated sensor, the humidity inside the watch case. The measured relative humidity values can then be transmitted wirelessly to a watch docking station.

However, one drawback of these measuring devices is that they require a power supply, such as a battery or cell. These devices are thus highly unsuitable for mechanical watches or watches of small dimensions. Moreover, for electronic watches, these devices can penalise autonomy or require the use of a larger-capacity cell or rechargeable battery, which may not be compatible with the volume available inside watch cases.

It should be noted that the notion of water-resistance in this text typically refers to resistance to water, whether in liquid or vapour form.

The term "humidity" refers to the relative humidity of the air.

SUMMARY OF THE INVENTION

The invention overcomes the aforementioned drawbacks by proposing, for this purpose, a device for measuring the humidity in the internal volume of a watch case, which device includes:
- a watch comprising a case housing an optical system, said optical system including a light beam transmitter, a multi-pass cell through which the light beam is intended to pass, and a light beam receiver for receiving said beam after it has passed through the multi-pass cell;
- a management module external to said case, including a processing unit configured to communicate with the optical system and to process data transmitted thereby in order to determine the humidity present in the internal volume of the case on the basis of the absorption of the light beam by the water vapour that may be present in said internal volume of the case.

In particular embodiments, the invention can further include one or more of the following features, taken alone or in any combination technically possible.

In particular embodiments, the processing unit is configured to control the transmitter so that it transmits or stops the transmission of a light beam.

In particular embodiments, the transmitter is a vertical-cavity surface-emitting laser or a vertical-external-cavity surface-emitting laser.

In particular embodiments, the management module comprises a power source configured to power the transmitter and receiver.

In particular embodiments, the power source is integrated into the internal volume of the watch.

BRIEF DESCRIPTION OF THE FIGURES

Other features and advantages of the invention will become apparent from the following detailed description, which is given by way of example embodiments that are by no means limiting, with reference to FIGS. 1 and 2, which diagrammatically show a device for measuring the humidity in the internal volume of a watch case according to the present invention.

DETAILED DESCRIPTION OF THE INVENTION

Figure 1:
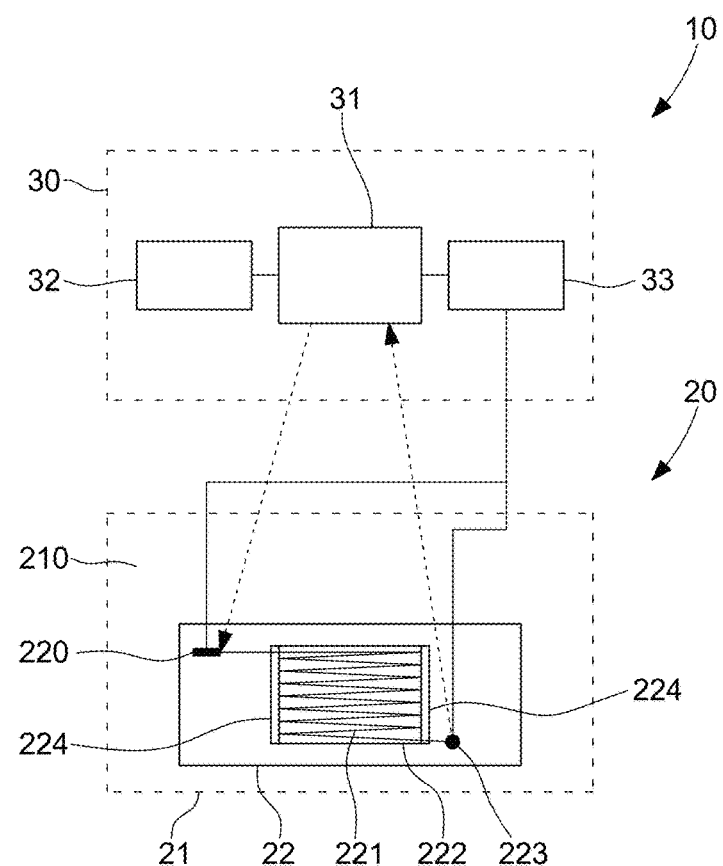
Figure 2:
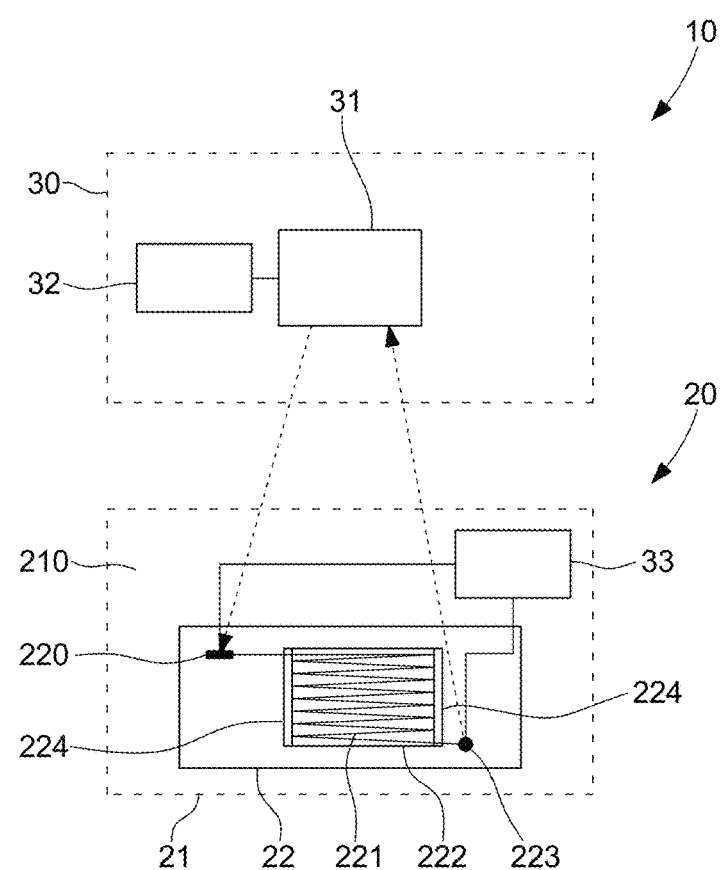

FIGS. 1 and 2 diagrammatically show a device 10 for measuring the humidity in the internal volume 210 of a watch case by cavity ring down spectroscopy. The internal volume of the case is defined, in a manner known per se, by a crystal, a back and a middle, and houses a horological movement.

The measuring device 10 according to the present invention comprises a watch 20, an optical system 22 housed in the case 21 of said watch 20, and a management module 30 external to said case 21. The management module 30 is said to be "external" to the case 21 in the sense that it is not housed in the internal volume 210 thereof.

The management module 30 comprises a processing unit 31 configured to communicate with the optical system 22 and process data transmitted thereby. The optical system 22 and the management module 30 are able to communicate preferably by wireless means.

Advantageously, the management module 30 can further include display members 32 configured to display a representation of the processed data, as described in more detail below.

The optical system 22 is fastened, for example, to the middle, on a dial of the watch 20, or on a structure of the horological movement such as a plate or a bridge. As can be seen from the diagrammatic representation in FIGS. 1 and 2, the optical system 22 includes a transmitter 220 transmitting a light beam 221, a multi-pass cell (MPC) through which the light beam 221 is intended to pass, and a receiver 223 intended to receive the light beam 221 once it has passed through the multi-pass cell 222.

It should be noted that such an optical system 22 is configured so that the light beam 221 travels between the transmitter 220 and the receiver 223 without being guided by an optical guide, such as an optical fibre or a dielectric waveguide, i.e. without being confined in a medium other than that of the internal volume 210 of said case 21.

During its propagation in the medium of the internal volume 210 of the watch 20, in this case air, the light beam 221 interacts with said medium, which causes a modification of the properties of said beam.

In particular, in the present invention, the device aims to measure the humidity present in the internal volume 210 of the case 21 of the watch 20 from the evaluation of a modification of the absorption of the light beam 221 by the water vapour that may be present in the internal volume 210 of the case 21. It should be noted that absorbance is measured and that, since the absorption coefficient of the water molecule, in particular of the water vapour, is known, the concentration of water present in the air of the internal volume 210 can be deduced.

The transmitter 220 comprises a collimated light source capable of transmitting a light beam 221 through the multi-pass cell 222 to the receiver 223. For example, the transmitter 220 is an external-cavity surface-emitting laser, also referred to as an external cavity diode laser or ECDL, or a vertical-cavity surface-emitting laser or VCSEL.

Advantageously, the transmitter 220 is configured so as to transmit a light beam 221 with a wavelength corresponding to one of the wavelengths absorbed by the water vapour, in particular a wavelength equal to 968.3 nm, 1388 nm, 2741.41 nm, 2662.48 nm or 6270.77 nm.

The transmitter 220 is also configured to communicate with the processing unit 31. In particular, the processing unit 31 is configured to transmit instructions to the transmitter 220 in order to transmit the light beam 221 or to stop transmitting it.

The multi-pass cell 222 includes, as diagrammatically shown in FIGS. 1 and 2, at least two reflective elements 224, for example made of aluminium oxide or titanium dioxide, having a reflectivity at the wavelength of the light beam 221. Thanks to the arrangement of the transmitter 220 and/or of the reflective elements 224, the light beam 221 is reflected a plurality of times by both of the reflective elements 224. Thus, the optical path of the light beam 221 is considerably increased, making it possible to increase the absorption of said light beam 221 by the water vapour that may be present in the volume and thus to improve the sensitivity of the measurement. More specifically, the greater the length of the optical path, the more accurate the measurement of the humidity by the measuring device 10. By way of example, the multi-pass cell 222 can be configured so that the optical path is between a few centimetres, for example ten centimetres, and a few metres, for example ten metres.

The receiver 223 comprises an optical light sensor including a photodiode. This receiver 223 is also provided with an analogue-to-digital converter for converting an analogue value relating to the intensity of the light beam 221 into data that can be used by the processing unit 31, such as a digital value. It should be noted that the receiver 223 can include a plurality of optical sensors, which makes it possible to amplify the difference in the signals from these optical sensors in order to reduce the effect of the relative intensity noise of the light beam 221, or to optimise the dynamic range of the analogue-to-digital converter. It is also possible to place an optical bandpass filter in front of the receiver 223 so that it is sensitive only to the wavelength transmitted by the transmitter 220.

The receiver 223 is configured to communicate with the processing unit 31 so as to transmit thereto data representative of the intensity of the light beam 221 transmitted by the transmitter 220.

The processing unit 31 can be an integrated circuit comprising hardware and software resources, in particular at least one processor cooperating with memory elements. This processing unit 31 is able to execute instructions for implementing a computer program in order to help determine the measurement of the humidity in the internal volume 210 of the case 21 of the watch 20.

More specifically, the processing unit 31 is able to control the transmitter 220 as described above and is configured to evaluate the absorption of said light beam 221 by the water vapour that may be present in said internal volume 210 of the case 21. In particular, the processing unit 31 is able to perform signal processing operations by means of signal modulation and synchronous detection operations. The processing unit 31 comprises, for example, in its memory elements, one or more lookup tables matching intensity values of the light beam 221 and/or coefficients of absorption of said light beam 221 by water vapour, with humidity values associated with the intensity values of the light beam 221 and/or the coefficients of absorption, in order to determine the humidity in the internal volume 210 of the case 21.

As shown in FIG. 1, the management module 30 can comprise a power source 33 configured to power the optical system, and in particular the transmitter 220 and the receiver 223, for example by means of wired or wireless power supply elements. By way of example, the wired power supply elements consist of a connector or a plug, respectively intended to be coupled to a plug or to a connector arranged on the case 21 of the watch 20. Moreover, the wireless power supply elements can comprise electromagnetic induction elements.

The display devices 32 can be analogue or digital. In particular, they are advantageously able to display a plurality of distinct visual signals representative of the value of the humidity determined by the processing unit 31. By way of example, they can consist of a display screen, a luminous scale, or a hand adapted to travel a value scale arranged in the form of an arc of a circle, etc.

More typically, it should be noted that the embodiments and implementations considered above have been described by way of non-limiting examples, and that other alternative embodiments and implementations are thus conceivable.

In particular, the power source 33 can be integrated into the internal volume 210 of the watch 20 and not into the management module 30, as shown in FIG. 2. Such a power source 33 can then be formed by a cell or a rechargeable battery of relatively small dimensions. This example embodiment of the invention is preferably applicable to electronic watches, as the cell or rechargeable battery constituting the power source 33 can be the cell or rechargeable battery that powers the horological movement.

Moreover, the management module 30 can be adapted to communicate information representative of the data processed by the processing unit 31 to an electronic device, such as a smartphone or tablet, capable of displaying a representation of the processed data.

The invention claimed is:

1. A measuring device for measuring humidity in an internal volume of a case of a watch, wherein the device comprises:
   the watch comprising the case housing an optical system, said optical system including a transmitter transmitting a light beam, a multi-pass cell through which the light beam is configured to pass, and a receiver configured to receive the light beam once it has passed through the multi-pass cell;
   a management module external to said case, including a processing unit configured to communicate with the optical system and to process data transmitted thereby in order to determine the humidity present in the internal volume of the case on the basis of an absorption of the light beam by water vapour that may be present in said internal volume of the case.

2. The measuring device according to claim 1, wherein the processing unit is configured to control the transmitter so that the transmitter transmits or stops the transmission of a light beam.

3. The measuring device according to claim 1, wherein the transmitter is a vertical-cavity surface-emitting laser or an external-cavity surface-emitting laser.

4. The measuring device according to claim 1, wherein the management module comprises a power source configured to power the transmitter and the receiver.

5. The measuring device according to claim 1, wherein a power source is integrated into the internal volume of the watch.

* * * * *